(No Model.)
T. GARRICK.
CHECK OR WATER HOOK.
No. 294,864.          Patented Mar. 11, 1884.
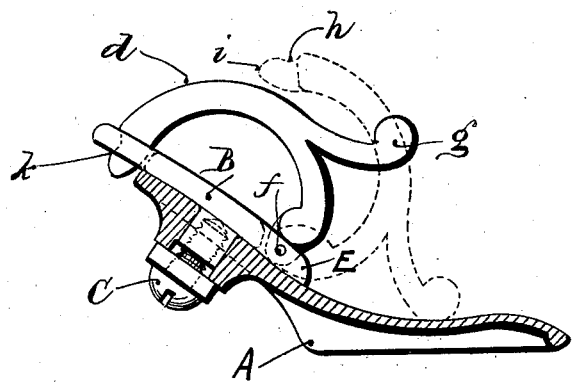
WITNESSES:
INVENTOR
Thomas Garrick

UNITED STATES PATENT OFFICE.

THOMAS GARRICK, OF PROVIDENCE, RHODE ISLAND.

CHECK OR WATER HOOK.

SPECIFICATION forming part of Letters Patent No. 294,864, dated March 11, 1884.

Application filed November 22, 1883. (No model.)

*To all whom it may concern:*

Be it known that I, THOMAS GARRICK, of the city and county of Providence, and State of Rhode Island, have invented a new and useful Improvement in Check or Water Hooks, which improvement is fully set forth in the following specification, reference being had to the accompanying drawing.

The object of my invention is to attach and detach the check-rein or overdraw with ease and rapidity, and to firmly secure the same in the check or water hook when in use.

The figure represents a longitudinal section of a saddle-plate with check-hook attached, as seen, opened and closed. A is the saddle-plate. B is the check or water hook, secured to saddle-plate A by means of screw C, passing through an aperture in saddle-plate A into an aperture having a thread in the foot of check-hook B. The hook or semicircular part $d$ is hinged to foot-bar $e$ by reason of pin $f$, passing through the apertures in both foot-bar $e$ and part $d$.

I do not wish to be understood as confining myself to any particular shape of part $d$, as its form can be varied anywhere from that of a semicircular form to that of a square.

The projection $g$ from part $d$ is for the purpose of obtaining a greater leverage in opening and closing the hook or part $d$; but it can be dispensed with. A portion of the metal is removed on part $d$ to form spheroidal end $i$ and groove $h$, so that when part $d$ is pressed down the spheroidal end $i$ springs into aperture $k$ in foot-bar $e$, forming a spring snap-catch, which holds part $d$ down into position, the metal in aperture $k$ being so removed to conform to groove $h$ and spheroidal end $i$, which forms the snap-catch.

The great advantage derived from my invention is, the draft upon the check-rein or overdraw produced by the horse's head causes spheroidal end $i$ to be firmly pressed against the side in aperture $k$, which tends to hold part $d$ more firmly down into position, thereby greatly relieving the strain on the hinge, and thus securing the check-rein or overdraw at pleasure in the check or water hook.

It is to be observed that part $d$ swings upon its hinge from the horse's head toward the vehicle when the horse is to be unchecked.

I claim—

1. In an improved check or water hook, the hinged hook or part $d$, provided with spheroidal end $i$ and groove $h$, in combination with the base or bar $e$, provided with aperture $k$, substantially as and for the purposes hereinbefore set forth.

2. As an improved article of manufacture in check or water hooks, the hook or part $d$, provided with spheroidal end $i$, groove $h$, and projection $g$, hinged to the base or bar $e$, and said spheroidal end $i$, with groove $h$, being adapted to engage aperture $k$ in said base or bar $e$ to form a snap-catch, substantially as shown and described.

THOMAS GARRICK.

Witnesses:
C. R. BRAYTON,
WM. A. CHAMPLAIN.

It is hereby certified that Letters Patent No. 294,864, granted March 11, 1884, upon the application of Thomas Garrick, of Providence, Rhode Island, for an improvement in "Check or Water Hooks," should have been issued to *Charles Downs*, of same place assignee of the entire interest in said invention; that the proper correction has been made in the files and records of the case in the Patent Office; and that the Letter Patent should be read with this correction therein to make it conform thereto.

Signed, countersigned, and sealed this 15th day of April, A. D. 1884.

[SEAL.]·

M. L. JOSLYN,
*Acting Secretary of the Interio*

Countersigned:
 BENJ. BUTTERWORTH,
  *Commissioner of Patents.*